US012659725B2

(12) United States Patent
Kumar et al.

(10) Patent No.: US 12,659,725 B2
(45) Date of Patent: Jun. 16, 2026

(54) METHOD AND APPARATUS FOR HANDLING USER EQUIPMENT RADIO CAPABILITY IDENTIFICATION (URC-ID) ASSIGNMENT PROCEDURE

(71) Applicant: Samsung Electronics Co., Ltd., Suwon-si (KR)

(72) Inventors: Lalith Kumar, Bangalore (IN); Varini Gupta, Bangalore (IN); Kundan Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 17/999,383

(22) PCT Filed: May 20, 2021

(86) PCT No.: PCT/KR2021/006296
§ 371 (c)(1),
(2) Date: Nov. 18, 2022

(87) PCT Pub. No.: WO2021/235874
PCT Pub. Date: Nov. 25, 2021

(65) Prior Publication Data
US 2023/0209332 A1 Jun. 29, 2023

(30) Foreign Application Priority Data

May 19, 2020 (IN) .............................. 202041021024
May 13, 2021 (IN) .............................. 202041021024

(51) Int. Cl.
*H04W 8/24* (2009.01)
*H04W 36/00* (2009.01)
(52) U.S. Cl.
CPC .......... *H04W 8/24* (2013.01); *H04W 36/0011* (2013.01)

(58) Field of Classification Search
CPC ......... H04W 36/0011; H04W 36/0022; H04W 36/0033
See application file for complete search history.

(56) References Cited

U.S. PATENT DOCUMENTS 10,939,280 B2 3/2021 Horn et al.
2011/0256855 A1 10/2011 Wang
(Continued)

FOREIGN PATENT DOCUMENTS

TW 201944818 A 11/2019

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.6.0 (Mar. 2020), 436 pages.
(Continued)

*Primary Examiner* — Barry W Taylor

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of handling a User Equipment (UE) Radio Capability (URC) Identification (URC-ID) assignment procedure is provided. The method comprises: receiving, by a UE radio Capability Management Function (UCMF), a request for assigning a URC-ID corresponding to a URC information of a UE from an Access and Mobility Management Function (AMF) or a Mobility Management
(Continued)

Entity (MME); determining, by the UCMF, whether the URC information is received in at least one of a first format and a second format; and performing, by the UCMF, one of: accepting the request for assigning the URC-ID in response to determining one of a) the URC information is received in both the first and the second formats, and b) the URC information is received in the first format and the URC information in the first format is available in a database associated with the UCMF, and assigning the respective URC ID to the UE, and rejecting the request for assigning the URC-ID in response to determining a) the URC information is not received in both the first format and the second format, and b) the URC information is received only in the first format and the URC information in the first format is not available in the database associated with the UCMF.

12 Claims, 5 Drawing Sheets

(56) References Cited

U.S. PATENT DOCUMENTS

| | | | | |
|---|---|---|---|---|
| 2020/0351762 | A1* | 11/2020 | Casati | H04W 8/24 |
| 2022/0070661 | A1* | 3/2022 | Liu | H04W 8/24 |
| 2022/0394683 | A1* | 12/2022 | Palenius | H04W 48/08 |
| 2023/0239683 | A1* | 7/2023 | Xu | H04W 8/22 |
| | | | | 370/328 |

OTHER PUBLICATIONS

Qualcomm Incorporated, "Editorial updates in RACS clauses", Change Request, 3GPP TSG-SA WG2 Meeting #137E (e-meeting), Feb. 24-27, 2020, S2-2001996, 7 pages.
NTT Docomo, "Access Network parameter required for SOR support", Change Request, SA WG2 Meeting #138E, Apr. 20-23, 2020 Electronic meeting, S2-2002858, 20 pages.
Nokia et al., "Support of multiple radio capability formats", 3GPP TSG-SA2 Meeting #138-E, Apr. 20-23, 2020, S2-2003206, 6 pages.
"3rd Generation Partnership Project; Technical Specification Group Core Network and Terminals; 5G System; UE radio capability management services; Stage 3 (Release 16)", 3GPP TS 29.673 V16.0.0 (Mar. 2020), 34 pages.

Office Action dated Jul. 15, 2022 in connection with India Patent Application No. 202041021024, 6 pages.
"3rd Generation Partnership Project; Technical Specification Group Radio Access Network; NR; Radio Resource Control (RRC) protocol specification (Release 16)", 3GPP TS 38.331 V16.0.0 (Mar. 2020), 835 pages.
"3rd Generation Partnership Project; Technical Specification Group Radio Access Network; NR; Evolved Universal Terrestrial Radio Access (E-UTRA); Radio Resource Control (RRC); Protocol specification (Release 16)", 3GPP TS 36.331 V16.0.0 (Mar. 2020), 1048 pages.
"3rd Generation Partnership Project; Technical Specification Group Services and System Aspects; Procedures for the 5G System (5GS); Stage 2 (Release 16)", 3GPP TS 23.502 V16.4.0 (Mar. 2020), 582 pages.
"3rd Generation Partnership Project; Technical Specification Group Services and System Aspects; System architecture for the 5G System (5GS); Stage 2 (Release 16)", 3GPP TS 23.501 V16.4.0 (Mar. 2020), 430 pages.
International Search Report dated Aug. 23, 2021 in connection with International Patent Application No. PCT/KR2021/006296, 4 pages.
Written Opinion of the International Searching Authority dated Aug. 23, 2021 in connection with International Patent Application No. PCT/KR2021/006296, 4 pages.
Supplementary European Search Report dated Oct. 16, 2023, in connection with European Patent Application No. 21808664.3, 13 pages.
Nokia et al., "support of multiple RADIO capability formats," S2-2001984, 3GPP TSG-SA2 Meeting #137-E, Online, Feb. 24-27, 2020, 5 pages.
3GPP TS 29.674 V1.1.0 (Mar. 2020), Technical Specification, 3rd Generation Partnership Project; Technical Specification Group Core Network and Terminals; Interface between the UE radio Capability Management Function (UCMF) and the Mobility Management Entity (MME); Stage 3 (Release 16), Mar. 2020, 31 pages.
Ericsson, "Open topics for Rel-16 UE Radio Capability Optimizations WI," R3-202158, 3GPP TSG-RAN WG3 Meeting #107bis-e, Online, Apr. 20-30, 2020, 5 pages.
Samsung et al., "Support of multiple coding formats," S2-2002955, SA WG2 Meeting #S2-138E, Electronic meeting, Apr. 20-24, 2020, 3 pages.
Office Action dated Jan. 30, 2026, in connection with Korean Application No. 10-2022-7042605, 8 pages.

* cited by examiner

[Fig. 1]
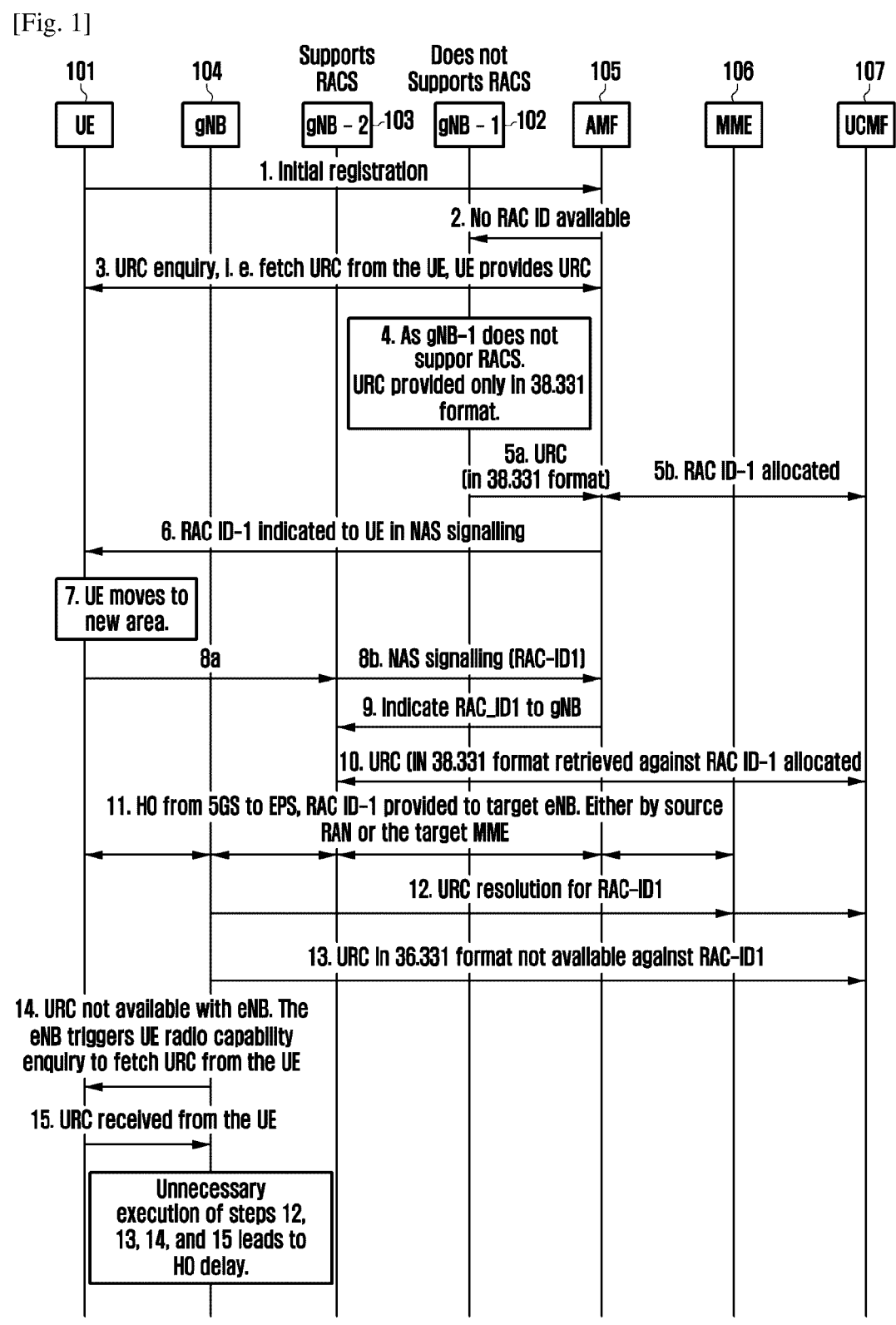

[Fig. 2]
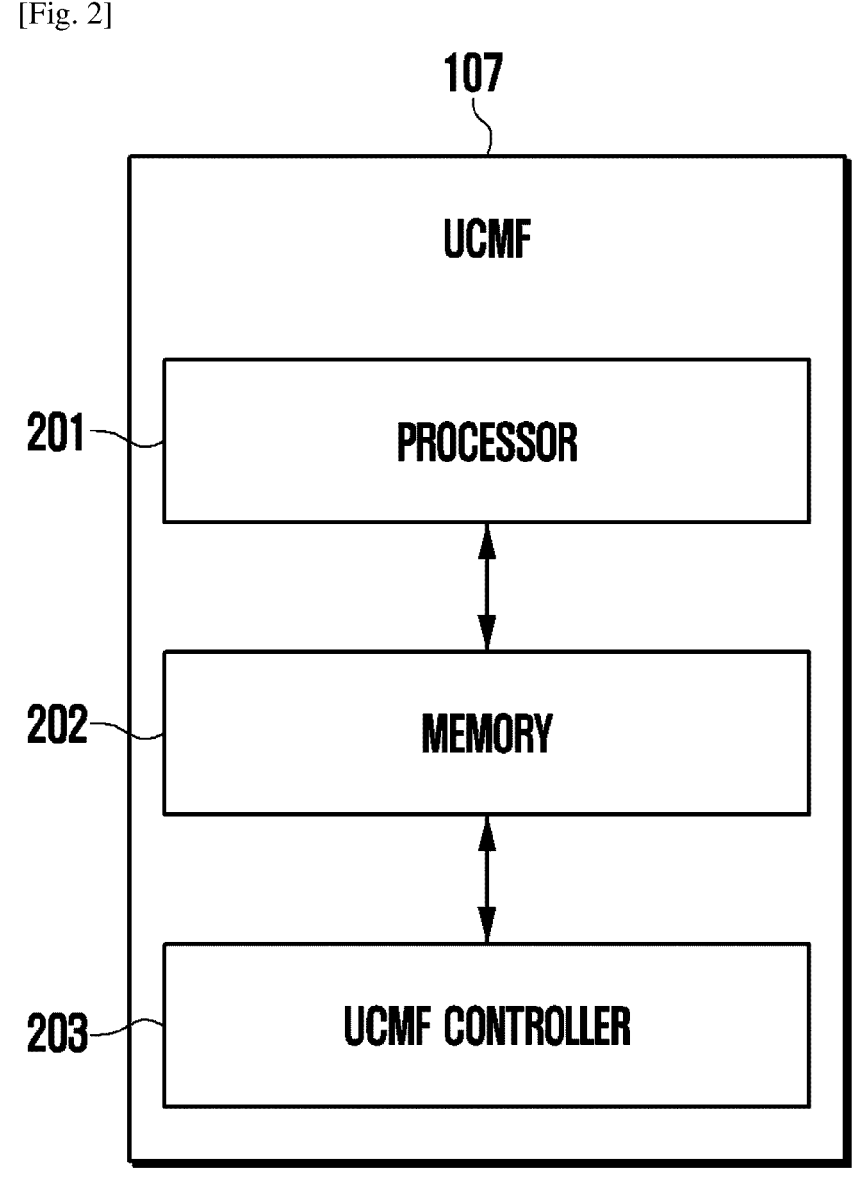

[Fig. 3]

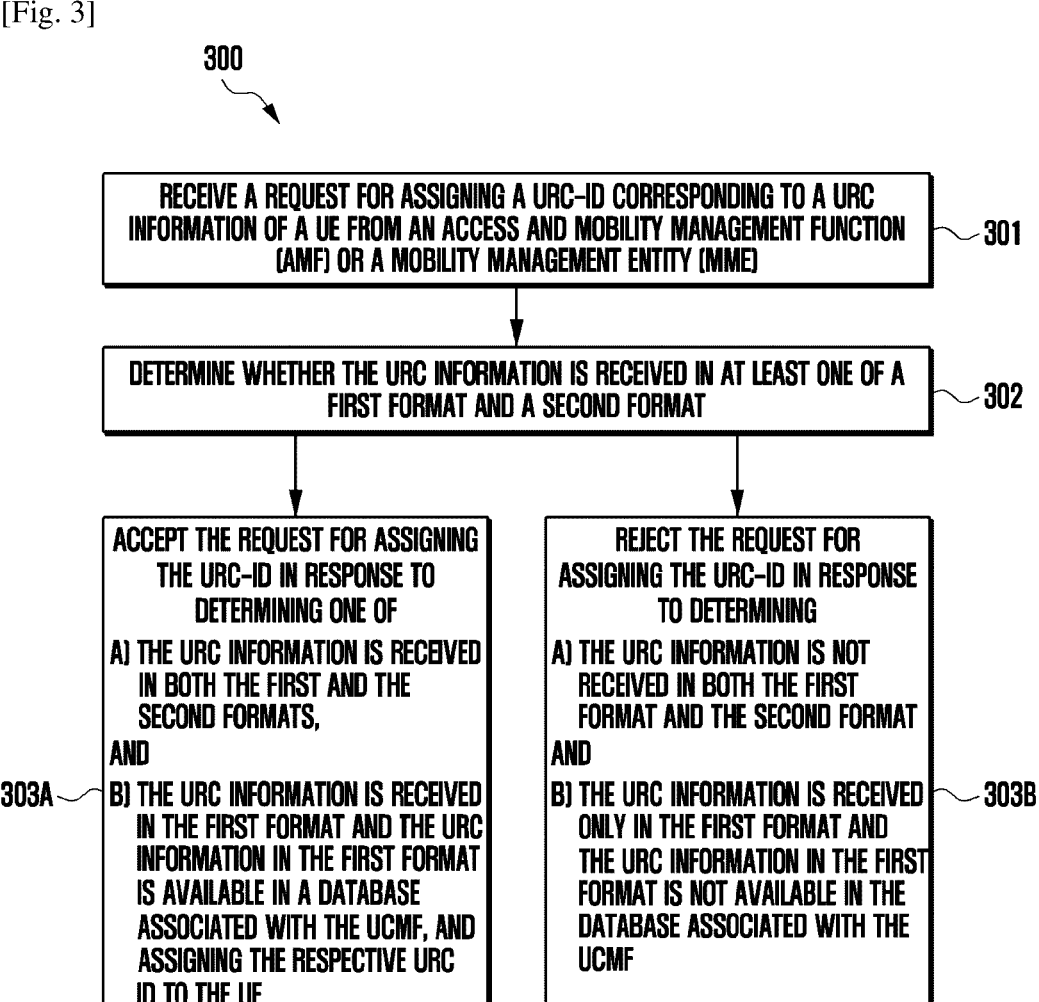

300

RECEIVE A REQUEST FOR ASSIGNING A URC-ID CORRESPONDING TO A URC INFORMATION OF A UE FROM AN ACCESS AND MOBILITY MANAGEMENT FUNCTION (AMF) OR A MOBILITY MANAGEMENT ENTITY (MME) — 301

DETERMINE WHETHER THE URC INFORMATION IS RECEIVED IN AT LEAST ONE OF A FIRST FORMAT AND A SECOND FORMAT — 302

303A — ACCEPT THE REQUEST FOR ASSIGNING THE URC-ID IN RESPONSE TO DETERMINING ONE OF

A) THE URC INFORMATION IS RECEIVED IN BOTH THE FIRST AND THE SECOND FORMATS,

AND

B) THE URC INFORMATION IS RECEIVED IN THE FIRST FORMAT AND THE URC INFORMATION IN THE FIRST FORMAT IS AVAILABLE IN A DATABASE ASSOCIATED WITH THE UCMF, AND ASSIGNING THE RESPECTIVE URC ID TO THE UE

REJECT THE REQUEST FOR ASSIGNING THE URC-ID IN RESPONSE TO DETERMINING

A) THE URC INFORMATION IS NOT RECEIVED IN BOTH THE FIRST FORMAT AND THE SECOND FORMAT

AND

B) THE URC INFORMATION IS RECEIVED ONLY IN THE FIRST FORMAT AND THE URC INFORMATION IN THE FIRST FORMAT IS NOT AVAILABLE IN THE DATABASE ASSOCIATED WITH THE UCMF — 303B

[Fig. 4]
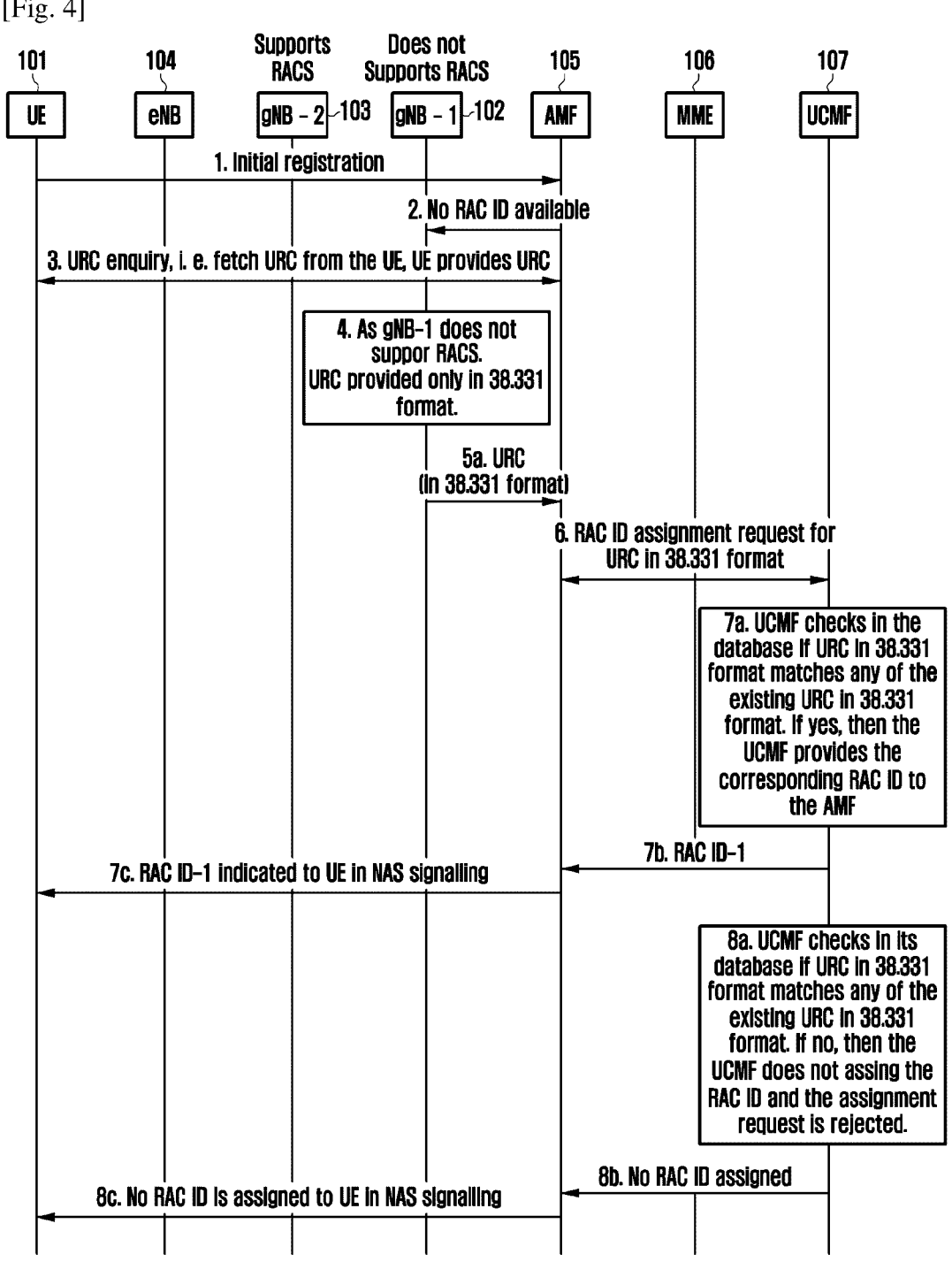

[Fig. 5]
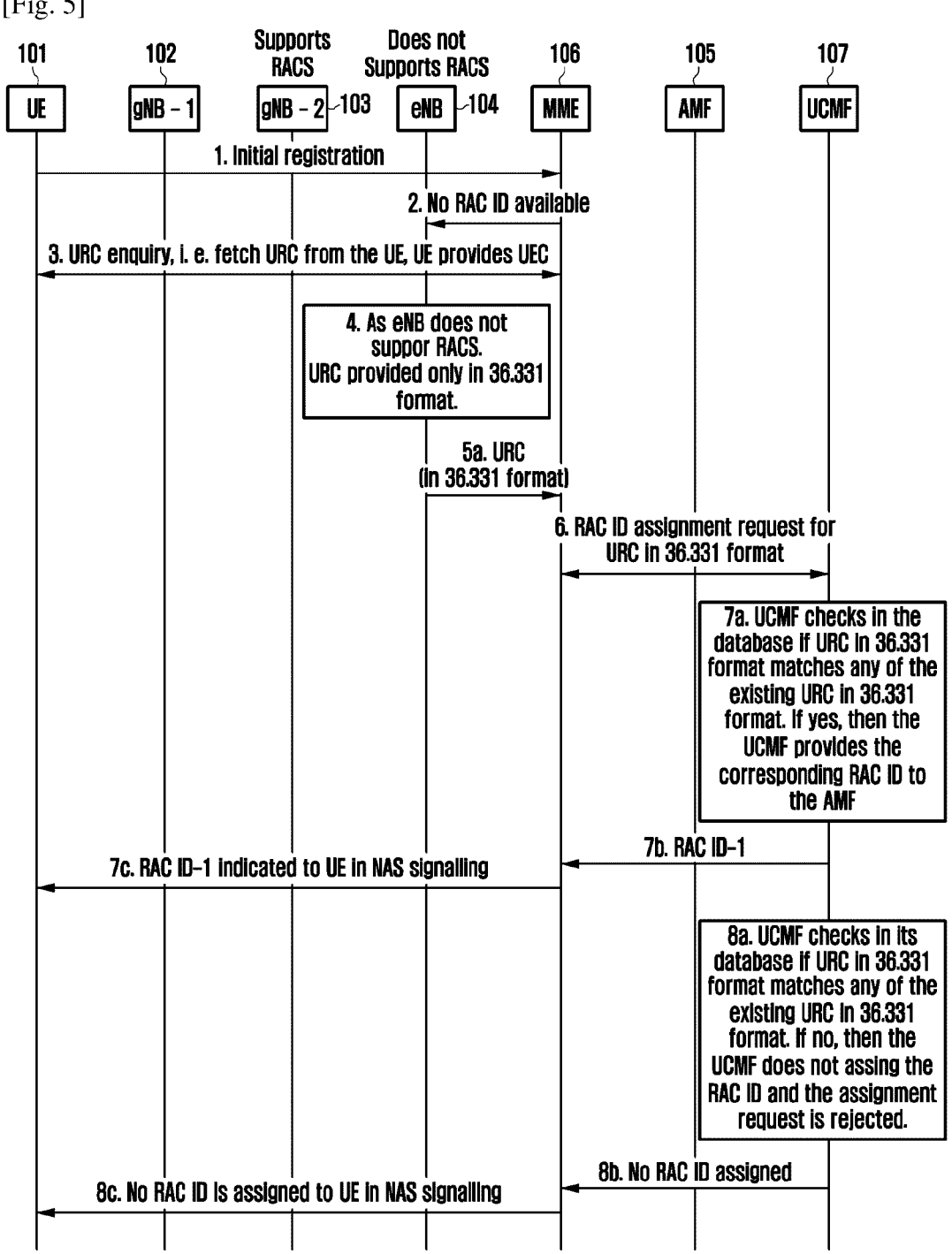

METHOD AND APPARATUS FOR HANDLING USER EQUIPMENT RADIO CAPABILITY IDENTIFICATION (URC-ID) ASSIGNMENT PROCEDURE

CROSS-REFERENCE TO RELATED APPLICATIONS

This application is a 371 National Stage of International Application No. PCT/KR2021/006296 filed on May 20, 2021, which claims priority to India Patent Application No. 202041021024 filed on May 19, 2020, and India Patent Application No. 202041021024 filed on May 13, 2021, the disclosures of which are herein incorporated by reference in their entirety.

BACKGROUND

1. Field

The present invention relates to field of wireless communication technology and in particular relates to a method and apparatus for handling a User Equipment (UE) Radio Capability (URC) Identification (URC-ID) assignment procedure.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In recent times, with change in the wireless communication technology there is an increase in the size of User Equipment (UE) Radio Capability (URC) information shared by the UE with a base station i.e. Radio Access Network (RAN). The URC information comprises, for example, one or more frequency bands supported by the UE, a power class supported by the UE, and the like. An efficient approach to signal URC information over the radio interface and other network interfaces to the RAN is defined using a URC optimization technique called as UE radio capability signaling optimization (RACS). The RACS works by assigning an identifier to represent a set of UE radio capabilities. This identifier is called UE Radio Access Capability Identification (URC-ID). The UE Radio Access Capability Identification is also referred to UE Radio Capability ID. The URC-ID of the UE may be assigned by at least one of a UE manufacturer or a Public Land Mobile Network (PLMN). The URC-ID is an alternative to the signaling of the UE radio capabilities over the radio interface, within New Generation (NG) RAN, from NG-RAN to E-UTRAN, from Access and Mobility Management Function (AMF) to NG-RAN, and between CN nodes supporting RACS.

A UE Radio Capability Management Function (UCMF) in a core network stores a mapping between the URC-ID of the UE and the corresponding URC information in the PLMN. Further, the UCMF assigns the URC-ID to the UE within the PLMN. The URC-ID stored in the UCMF may be associated to one or more formats used to store the URC information. The one or more formats includes TS 36.331 (this is also called as EPS format) and TS 38.331 (this is also called as 5GS format).

The PLMN-assigns the URC-ID to the UE using the UE Configuration Update Command, or Registration Accept as defined in TS 23.502. The UCMF is configured with a Version ID for PLMN-assigned URC-ID, is defined.

The NG-RAN in a PLMN may be configured in two modes of operation. In the first mode of operation (i.e. Mode-A) the NG-RAN provides the URC information to the AMF in both formats (i.e. the TS 38.331 format and the corresponding TS 36.331 format). The NG-RAN generates the URC information in TS 36.331 format by transcoding the TS 38.331 format received from the UE using a URC Enquiry procedure (see TS 38.331). In the second mode of operation (i.e. Mode-B) the NG-RAN provides the URC information to the AMF in the TS 38.331 format only.

The second mode of operation (i.e. Mode-B) is configured in the NG-RAN when the PLMN supports RACS in both EPS and 5GS and if the RAN nodes in the EPS and 5GS are configured in the second mode of operation (i.e. Mode-B), then the UCMF transcodes the URC information from the TS 36.331 format to TS 38.331 format and vice versa.

When operating in a first mode of operation (i.e. Mode-A), i.e., the PLMN supports both 5GS and Evolved Packet System (EPS), where RAN node is expected to provide the URC information in both TS 36.331 and TS 38.331 coding formats but in a portion of the geographical area of the PLMN wide deployment, one or more RAN nodes are not upgraded to provide the URC information in both the coding formats. Now mainly considering from the Handover perspective there are potential services which cannot tolerate any kind of delay for example Ultra-reliable Low Latency Communication (URLLC) services. If during the hand over procedure source RAN node provides URC ID to the target RAN node and target RAN node does not have the URC ID then target RAN node needs to resolve it from the core network and receive the mapped URC information. If core-network also fails to resolve the URC ID and is not able to provide URC information, the target RAN node is forced to resolve the URC information from the UE at the radio interface. The above mentioned additional procedures leads to a delay during a handover of the UE from one RAN to other RAN. Further, the delay may lead to loss of communication at the UE.

Thus, it is desired to address the above mentioned disadvantages or other shortcomings or at least provide a useful alternative.

SUMMARY

Accordingly the embodiment herein is to provide a method for handling a User Equipment (UE) Radio Capability (URC) Identification (URC-ID) assignment procedure, wherein the method comprises receiving a request for assigning a URC-ID corresponding to a URC information of a UE from an Access and Mobility Management Function (AMF) or a Mobility Management Entity (MME). Further, determining whether the URC information is received in at least one of a first format and a second format. Furthermore, performing one of accepting the request for assigning the URC-ID in response to determining one of the URC information is received in both the first and the second formats, and the URC information is received in the first format and the URC information in the first format is available in a database associated with the UCMF, and assigning the respective URC ID to the UE, and rejecting the request for assigning the URC-ID in response to determining the URC information is not received in both the first format and the second format, and the URC information is received only in the first format and the URC information in the first format is not available in the database associated with the UCMF.

In an embodiment, the first format of the URC information is a Fifth Generation System (5GS) format and the second format of the URC information is an Evolved Packet System (EPS) format.

In an embodiment, the first format of the URC information is an EPS format and the second format of the URC information is a 5GS format.

In an embodiment, assigning the URC ID to the UE comprises sending the URC-ID from the UCMF to the AMF via a service operation including a Nucmf_assign service operation. Further, sending the URC-ID from the AMF to the UE via a Non-access stratum (NAS) message.

In an embodiment, the UCMF is configured to operate in Mode of Operation A, wherein the UCMF is not capable of transcoding the URC information from the first format to the second format.

Accordingly the embodiment herein is to provide a User Equipment radio Capability Management Function (UCMF) for handling a User Equipment (UE) Radio Capability (URC) Identification (URC-ID) assignment procedure. The UCMF comprises a memory, a processor, and a UCMF controller communicatively coupled to the processor and the memory. Where the UCMF controller is configured to receive a request for assigning a URC-ID corresponding to a URC information of a UE from an Access and Mobility Management Function (AMF) or a Mobility Management Entity (MME). Further, the UCMF controller is configured to determine whether the URC information is received in at least one of a first format and a second format. Furthermore, the UCMF controller is configured to perform one of accepting the request for assigning the URC-ID in response to determining one of the URC information is received in both the first and the second formats, and the URC information is received in the first format and the URC information in the first format is available in a database associated with the UCMF, and assigning the respective URC ID to the UE, and rejecting the request for assigning the URC-ID in response to determining the URC information is not received in both the first format and the second format, and the URC information is received only in the first format and the URC information in the first format is not available in the database associated with the UCMF.

In an embodiment, the first format of the URC information is a Fifth Generation System (5GS) format and the second format of the URC information is an Evolved Packet System (EPS) format.

In an embodiment, the first format of the URC information is an EPS format and the second format of the URC information is a 5GS format.

In an embodiment, the UCMF controller is configured to assign the URC ID to the UE comprises sending the URC-ID from the UCMF to the AMF via a service operation including a Nucmf_assign service operation. Further, sending the URC-ID from the AMF to the UE via a Non-access stratum (NAS) message.

In an embodiment, the UCMF controller is configured to operate in Mode of Operation A, wherein the UCMF is not capable of transcoding the URC information from the first format to the second format.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method and apparatus for handling URC-ID when gNB does not support Resource and Admission Control Subsystem (RACS).

Another object of the embodiments herein is to reduce the delay during the handover of the UE.

Another object of the embodiments herein is to avoid the resolution or generation of the URC-ID due to different formats used to represent the URC information.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 1 shows a signaling diagram illustrating problems in the existing methods, according to the prior art;

FIG. 2 shows a simplified block diagram of the UCMF, according to the embodiments as disclosed herein;

FIG. 3 shows a flowchart illustrating method steps for handling a User Equipment (UE) Radio Capability (URC) Identification (URC-ID) assignment procedure, according to the embodiments as disclosed herein;

FIG. 4 is a signaling diagram illustrating a scenario of URC-ID assignment procedure in 5GS in which the UCMF receives the URC information in a 5GS format, according to the embodiments as disclosed herein; and FIG. 5 is a signaling diagram illustrating a scenario of URC-ID assignment procedure in EPS in which the UCMF receives the URC information in the EPS format, according to the embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiment herein is to provide a method and apparatus for handling URC-ID assignment procedure when gNB or eNB does not support UE radio capability signaling optimization (RACS). In mode of operation-A, The UCMF is not capable of transcoding the URC format from 38.331 format to 36.331 format and vice versa. Further, the RAN nodes may have not yet been upgraded to support RACS, such RAN nodes will provide URC information in only one coding format. The URC information in only one format can lead to critical delay in operation of some procedures at core network. The proposed method will provide the solution to solve the issue related to the above mentioned procedure.

Referring now to the drawings and more particularly to FIGS. 1 through 5, where similar reference characters denote corresponding features consistently throughout the figures, there are shown preferred embodiments.

FIG. 1 shows a signaling diagram illustrating problems in the existing methods, according to the prior art.

Referring to the FIG. 1, a User Equipment (UE (101)) initiates an initial registration procedure in a 5G system (5GS), when the UE (101) does not have a Radio Access Capability Identification (URC-ID) allocated by the 5GS as indicated by the signal 1 in FIG. 1, sent by the UE (101) to a Access and Mobility Management Function (AMF (105)). In the present disclosure, the word "URC-ID" and the "RAC-ID" is used interchangeably. The AMF (105) cannot provide UE radio capabilities (URC) information to gNB-1 (102) servicing the UE (101) because the URC-ID is not allocated to the UE (101) and the AMF (105) do not possess the URC information corresponding to the UE (101) in a mapping stored by the AMF (105). The AMF (105) indicates the non-availability of the URC information and the URC-ID corresponding to the UE (101) to the gNB-1 (102) as indicated by the signal 2 in FIG. 1. Further, due to un-availability of the URC information at gNB-1 (102), the gNB-1 (102) fetches the URC information from the UE (101) as indicated by the signal 3 in FIG. 1. The UE (101) provides the URC information in TS 38.331 format, because the gNB-1 (102) does not support URC optimization technique i.e. RACS as indicated by the signal 4 in FIG. 1. Further, the gNB-1 (102) provides the URC information in the TS 38.331 format to the AMF (105) as indicated by the signal 5*a* in FIG. 1. The gNB-1 (102) will not be able to provide the URC information in both the 38.331 format and the 36.331 format to the AMF (105) because the PLMN is operating in a Mode-A. In Mode-A of operation, the UCMF (107) is not capable of translating or transcoding the URC information from the 38.331 format to the 36.331 format. Alternatively, if the gNB-1 (102) is not upgraded, the gNB-1 (102) is not be able to provide the URC information in both the 36.331 format and the 38.331 format to AMF (105) in the Core Network (CN). The AMF (105) requests URC-ID assignment corresponding to the URC information to the UCMF (107). The UCMF (107) allocates a value of the URC-ID (for example, say URC-ID1) corresponding to the URC information of the UE (101). Further, the URC-ID1 is indicated to the AMF (105) as indicated by the signal 5*b* in FIG. 1. The AMF (105) provides the URC-ID1 to the UE (101) in a NAS signaling message as indicated by the signal 6 in FIG. 1.

In an embodiment, the UE (101) may move from a geographical area serviced by the gNB-1 (102) to a geographical area serviced by gNB-2 (103) in the 5GS as indicated by the signal 7 in FIG. 1. For example, consider the gNB-2 (103) to support RACS. The UE (101) provides the URC-ID1 in the NAS signaling to the AMF (105)-1 as indicated by signal 8*a*. and 8*b* in FIG. 1. The AMF (105) in the CN provides the URC-ID1 of the UE (101) to the gNB-2 (103) because the gNB-2 (103) supports the RACS as indicated by the signal 9 in FIG. 1.

Further, the gNB-2 (103) requests for the resolution of the URC-ID1 from the UCMF (107) in the CN as indicated by the signal 10 in FIG. 1. The gNB-2 (103) receives the URC information in 38.331 format from the UCMF (107) in the CN. The AMF (105) and the UCMF (107) together resolve the URC-ID1 and retrieve the URC information in the 38.331 format from the mapping of the URC-ID and the URC information stored for UEs. The gNB-2 (103) provides communication services to the UE (101) using the URC information obtained from the core network (CN) (including the AMF (105) and the UCMF (107).

In an embodiment, if a handover request is triggered from 5GS to Evolved Packet switched System (EPS), then a target eNB (104) will receive the URC-ID1 of the UE (101) from one of a source gNB (i.e. gNB-2 (103)) or a target MME (106) as indicated by the signal 11 in FIG. 1. The eNB (104) will request the CN including the MME (106) and the UMCF to resolve the URC-ID to the URC information in 36.331 format as indicated by the signal 12 in FIG. 1. The CN indicates to the target eNB (104) un-availability of the URC information corresponding to the URC-ID1 in 36.331 format as indicated by the signal 13 in FIG. 1. In one embodiment, the eNB (104) requests the URC information in 36.331 format from the UE (101) as indicated by the signal 14 in FIG. 1, because the URC information in not available with the eNB (104) and the resolution of the URC-ID is not possible because the URC information in 36.331 format is not available with the UCMF (107). Further, the UE (101) sends the URC information in 36.331 format to the eNB (104) as indicated by the signal 15 in FIG. 1.

Because of the signals as indicated in the steps 12, 13, 14, and 15 there is a delay in the handover procedure of the UE (101) which is not acceptable for time sensitive services such as Ultra-reliable low latency communication. In particular, the steps 14 and 15 including the transmission of the URC information leads to a delay in the handover of the UE (101), because of a size of the URC information.

FIG. 2 shows a simplified block diagram of the UCMF, according to the embodiments as disclosed herein.

In an embodiment, the UCMF (107) comprises a processor (201), a memory (202) and a UCMF controller (203). The UCMF controller (203) is communicatively coupled to the processor (201) and the memory (202). The memory (202) may store the URC information in at least one of 36.331 format and the 38.331 format, the URC-ID associated with the URC information, and the like. Further, the UCMF controller (203) and the processor (301) is configured to send and receive one or more messages with the AMF (105) and the MME (106). In particular, the UCMF controller (203) and the processor (201) is configured to receive the URC information from the AMF (105) or the MME (106) and provide the URC-ID corresponding to the URC information to the AMF (105) or the MME (106), and the like.

Further, the UCMF controller (203) is configured to check if the URC information received from the AMF (105) or the MME (106) is in a first format or a second format or in both the first format and the second format. the first format of the URC information is a Fifth Generation System (5GS) format and the second format of the URC information is an Evolved Packet System (EPS) format or vice versa.

Furthermore, the UCMF controller (203) is configured to determine whether the URC information received from the AMF (105) or the MME (106) is available in a database associated with the UCMF (107). The database may be a remote storage device communicatively connected with the UCMF (107). In another embodiment, the database may be implemented in the memory (202) of the UCMF (107).

Thereafter, the UCMF controller (203) is configured to generate and assign the URC-ID to the UE (101) when the URC information is received in both the first format and the second format. In another embodiment, the UCMF controller (303) is configured to obtain the URC-ID from the database when the URC information received from the AMF (105) or MME (106) is available in the database. The UCMF controller (303) is configured to provide the URC-ID to the AMF (105) via a service operation including the Nucmf_assign service operation. The AMF (105) provides the URC-ID to the UE (101) via a Non-access stratum (NAS) message.

The processor (201) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (201) may include multiple cores to execute the instructions.

The UCMF controller (203) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

FIG. 3 shows a flowchart illustrating method steps for handling a User Equipment (UE) Radio Capability (URC) Identification (URC-ID) assignment procedure, according to the embodiments as disclosed herein.

At the step 301, the method comprises receiving, by a UE radio Capability Management Function (UCMF) (107), a request for assigning a URC-ID corresponding to a URC information of a UE (101) from an Access and Mobility Management Function (AMF) or a Mobility Management Entity (MME).

The UCMF (107) is configured to operate in Mode of Operation A, wherein the UCMF (107) is not capable of transcoding the URC information from the first format to the second format and vice versa.

In an embodiment, when the UE (101) performs an initial registration procedure with the AMF (105) or the MME (106). Further, the AMF (105) or the MME (106) cannot provide the URC to the gNB or the eNB serving the UE (101) respectively, because the URC-ID is not allocated to the UE (101). The AMF (105) or the MME (106) indicates to the gNB or the eNB respectively, the non-availability of the URC-ID. Further, the gNB or the eNB requests the URC information from the UE (101). Upon receiving the URC information from the UE (101), the gNB (102, 103) or the eNB (104) provides the URC information to the AMF (105) or the MME (106) respectively. The gNB or the eNB may receive the URC information in at least one of the 38.331 format, 36.331 format or in both 38.331 format and the 36.331 format depending on the support for RACS. Further, the UCMF (107) receives from the AMF (105) or the MME (106), the URC information and request for assigning the URC-ID corresponding to the URC information of the UE (101).

At the step 302, the method comprises determining, by the UCMF (107), whether the URC information is received in at least one of a first format and a second format.

In an embodiment, the first format of the URC information is a Fifth Generation System (5GS) format (i.e. 38.331 format) and the second format of the URC information is an Evolved Packet System (EPS) format (i.e. 36.331 format).

In another embodiment, the first format of the URC information is the EPS format (i.e. 36.331 format) and the second format of the URC information is the 5GS format (i.e. 38.331 format).

In an embodiment, upon receiving the URC information from the AMF (105) or the MME (106), the UCMF (107) determines the format of the received URC information. In a first example, the URC information may be received only in the 5GS format (i.e. 38.331 format). In a second example, the URC information may be received only the EPS format (i.e. 36.331 format). In a third example, the URC information may be received in both the 5GS format (i.e. 38.331 format) and the EPS format (i.e. 36.331 format).

In an embodiment, the UCMF performs the steps detailed in 303A or 303B based on the format of the URC information received by the UCMF (107).

At the step 303A, the method comprises performing, by the UCMF (107), accepting the request for assigning the URC-ID in response to determining one of a) the URC information is received in both the first and the second formats, and b) the URC information is received in the first format and the URC information in the first format is available in a database associated with the UCMF (107), and assigning the respective URC ID to the UE (101).

In an embodiment, when the UCMF (107) receives the URC information in both the first format (for example, say 38.331 format or the 5GS format) and in the second format (for example, say 36.331 format or the EPS format), the UCMF (107) generates the URC-ID corresponding to the URC information and assigns the URC-ID to the UE (101).

In an embodiment, when the UCMF (107) receives the URC information in the first format (for example, say 36.331 format or the EPS format), the UCMF (107) compares the received URC information with a plurality of URC information's stored in the first format in the database associated with the UCMF (107). If the received URC information is available in the database, then the UCMF (107) obtains the URC-ID corresponding to the received URC information from the database and assigns the URC-ID to the UE (101).

In an embodiment, the procedure to check the availability of the URC in 38.331 format when the URC only in 36.331 format is received by the UCMF (107) can be done when the URC-ID assignment procedure is initiated by the EPS, i.e. when the request to assign the URC-ID is received from the MME (106) to UCMF (107). The URC information in 38.331 coding format may correspond to multiple URC information in 36.331 format stored in database of the UCMF (107). The URC information in 38.331 format is a subset of the 36.331 format. For example, if the URC information in 4G and 5G is: xxxyyy, then URC-ID-1 can be 38.331 format (xxxyyy)+36.331 format (xxxyyyaaabbb) and URC-ID-2 can be 38.331 format (xxxyyy)+36.331 format (xxxyyyaabb). The URC-ID depends on the 36.331 coding format of the legacy Radio access technologies (RATs) and not only on the 5GS and the EPS. When the URC information is received in the 36.331 format, the UCMF (107) may search for the corresponding URC information in the database.

In an embodiment, when the UCMF (107) receives the URC information in the first format (for example, say 38.331 format or the 5GS format), the UCMF (107) compares the received URC information with a plurality of URC information's of the same 38.331 format stored in the database associated with the UCMF (107). If the received URC information is available in the database, then the UCMF (107) obtains the URC-ID corresponding to the received URC information from the database and assigns the URC-ID to the UE (101).

In an embodiment, the UCMF (107) assigns the URC-ID to the UE (101) by sending the URC-ID from the UCMF (107) to the AMF (105) via the service operation including a Nucmf_assign service operation. Further, the UCMF (107) sends the URC-ID from the AMF (105) to the UE (101) via a Non-access stratum (NAS) message.

At the step 303B, the method comprises performing, by the UCMF (107), rejecting the request for assigning the URC-ID in response to determining a) the URC information is not received in both the first format and the second format, and b) the URC information is received only in the first format and the URC information in the first format is not available in the database associated with the UCMF (107).

In an embodiment, when the UCMF (107) does not receive the URC information in both the first format and the second format (i.e. URC information in received only 36.331 format or only in 38.331 format), and the received URC information of the given format is not available in the database, then the UCMF (107) rejects the request for assigning the URC-ID. The UCMF (107) indicates the non-assignment of the URC-ID to the UE (101) via the AMF (105).

For example, if the URC information in received in 36.331 format and the received URC information is not available in the database then the UCMF (107) rejects the request for assigning the URC-ID.

In another example, if the URC information in received in 38.331 format and the received URC information is not available in the database then the UCMF (107) rejects the request for assigning the URC-ID.

FIG. 4 is a signaling diagram illustrating a scenario of URC-ID assignment procedure in 5GS when the UCMF (107) receives the URC information in a 5GS format, according to the embodiments as disclosed herein.

Referring to the FIG. 4, the User Equipment (UE (101)) initiates an initial registration procedure in the 5G system (5GS), when the UE (101) does not have the Radio Access Capability Identification (URC-ID) allocated by the 5GS as indicated by the signal 1 in FIG. 4. The initial registration procedure initiated by the UE (101) is sent to the Access and Mobility Management Function (AMF (105)) as indicated by the signal 1 in FIG. 4. The AMF (105) cannot provide UE radio capabilities (URC) information to gNB-1 (102) servicing the UE (101) because the URC-ID is not allocated to the UE (101). The AMF (105) indicates the non-availability of the URC-ID as indicated by the signal 2 in FIG. 4. Further, due to un-availability of the URC information at gNB-1 (102), the gNB-1 (102) fetches the URC information from the UE (101) as indicated by the signal 3 in FIG. 4.

The UE (101) provides the URC information in TS 38.331 format, as indicated by the signal 4 in FIG. 4. As gNB-1 (102) does not support RACS, gNB-1 (102) will not be able to provide the URC information both in 38.331 format and 36.331 format. Because the PLMN is operating in the mode-A, where the UCMF (107) is not capable of translating the URC information from the 38.331 format to the 36.331 format. At the same time as the gNB-1 (102) is not upgraded, the gNB-1 (102) will not be able to provide the URC in both 36.331 and 38.331 format to the core network (including the AMF (105) and the UCMF (107)). The gNB-1 (102) provides the URC information in the TS 38.331 format to the AMF (105) as indicated by the signal 5 in FIG. 4. The AMF (105) requests URC-ID assignment corresponding to the URC information to the UCMF (107) as indicated by the signal 6 in FIG. 4.

The UCMF (107) determines that the URC information is received in the first format only. Further, the UCMF (107) checks in the database, if the received URC information in the 38.331 format matches any of the existing URC information in the 38.331 format as indicated by the signal 7a in FIG. 4. The UCMF (107) provides the URC-ID corresponding to the received URC information to the AMF (105) as indicated by the signal 7b in FIG. 4, when the received URC information is available in the database. The AMF (105) provides the URC-ID to the UE (101) via the NAS signaling message as indicated by the signal 7c in FIG. 4.

Alternatively, if the UCMF (107) could not find the received URC information in the database as indicated by the signal 8a in FIG. 4, the UCMF (107) rejects the request to assign URC-ID. The UCMF (107) sends the reject message (i.e. No URC-ID assigned) to the AMF (105) as indicated by the signal 8b in FIG. 4. The URC-ID is not signaled to the UE (101) in the NAS signaling message as indicated by the signal 8c in FIG. 4.

FIG. 5 is a signaling diagram illustrating a URC-ID assignment procedure in EPS in which the UCMF (107) receives the URC information in the first format (i.e. EPS format), according to the embodiments as disclosed herein.

Referring to the FIG. 5 the User Equipment (UE (101)) initiates an initial registration procedure in the EPS, when the UE (101) does not have the Radio Access Capability Identification (URC-ID) allocated by the EPS as indicated by the signal 1 in FIG. 5. The initial registration procedure initiated by the UE (101) is sent to the MME (106) as indicated by the signal 1 in FIG. 5. The MME (106) cannot provide UE radio capabilities (URC) information to the eNB (104) servicing the UE (101) because the URC-ID is not allocated to the UE (101). The MME (106) indicates the non-availability of the URC-ID as indicated by the signal 2 in FIG. 5. Further, due to un-availability of the URC information at eNB (104), the eNB (104) fetches the URC information from the UE (101) as indicated by the signal 3 in FIG. 5.

The UE (101) provides the URC information in TS 36.331 format, as indicated by the signal 4 in FIG. 5. As eNB (104) does not support RACS, eNB (104) will not be able to provide the URC information both in 38.331 format and 36.331 format. Because the PLMN is operating in the mode-A, where the UCMF (107) is not capable of translating the URC information from the 36.331 format to the 38.331 format. At the same time as the eNB (104) is not upgraded, and the eNB (104) will not be able to provide the URC in both 36.331 and 38.331 format to the core network (including the MME (106) and the UCMF (107)). The eNB (104) provides the URC information in the TS 36.331 format to the MME (106) as indicated by the signal 5 in FIG. 5.

The MME (106) requests the URC-ID assignment corresponding to the URC information to the UCMF (107) as indicated by the signal 6 in FIG. 5. The UCMF (107) determines that the URC information is received in the first format (i.e. EPS format) only. Further, the UCMF (107)

checks in the database, if the received URC information in the 36.331 format matches any of the existing URC information in the 36.331 format as indicated by the signal 7a in FIG. 5. The UCMF (107) provides the URC-ID corresponding to the received URC information to the MME (106) as indicated by the signal 7b in FIG. 5, when the received URC information is available in the database. The MME (106) provides the URC-ID to the UE (101) via the NAS signaling message as indicated by the signal 7c in FIG. 5.

Alternatively, if the UCMF (107) could not find the received URC information in the database as indicated by the signal 8a in FIG. 5, the UCMF (107) rejects the request to assign URC-ID. The UCMF (107) sends the reject message (i.e. No URC-ID assigned) to the MME (106) as indicated by the signal 8b in FIG. 5. The URC-ID is not signaled to the UE (101) in the NAS signaling message as indicated by the signal 8c in FIG. 5.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) radio capability management function (UCMF) in a communication system, the method comprising:

receiving, from an access and mobility management function (AMF), a request for assigning a UE radio capability identifier (ID) of a UE corresponding to UE radio capability information, the request including the UE radio capability information;

determining that the UE radio capability information is not received in both a first format associated with a first system and a second format associated with a second system and that a match of the UE radio capability information is not found in a database of the UCMF; and based on the determination, transmitting, to the AMF, a message that rejects the request for assigning the UE radio capability ID, wherein the UCMF is configured to operate in a mode where a next generation radio access network (NG-RAN) provides the UE radio capability information in both the first format and the second format, and the UCMF is not required to transcode between the first format and the second format.

2. The method of claim 1, wherein the message indicates that there is no UE radio capability ID to be assigned.

3. The method of claim 1, wherein the first format is a fifth-generation system (5GS) format and the second format is an evolved packet system (EPS) format, and wherein the UE radio capability information is in the 5GS format or in the EPS format or in both the 5GS and the EPS format.

4. A method performed by an access and mobility management function (AMF) in a communication system, the method comprising:

transmitting, to a user equipment (UE) radio capability management function (UCMF), a request for assigning a UE radio capability identifier (ID) of a UE corresponding to UE radio capability information, the request including the UE radio capability information; and receiving, from the UCMF, a message that rejects the request for assigning the UE radio capability ID, in case that the UE radio capability information is not transmitted in both a first format associated with a first system and a second format associated with a second system and a match of the UE radio capability information is not found in a database of the UCMF, wherein the UCMF is configured to operate in a mode where a next generation radio access network (NG-RAN) provides the UE radio capability information in both the first format and the second format, and the UCMF is not required to transcode between the first format and the second format.

5. The method of claim 4, wherein the message indicates that there is no UE radio capability ID to be assigned.

6. The method of claim 4, wherein the first format is a fifth-generation system (5GS) format and the second format is an evolved packet system (EPS) format, and wherein the UE radio capability information is in the 5GS format or in the EPS format or in both the 5GS and the EPS format.

7. A user equipment (UE) radio capability management function (UCMF) in a communication system, the UCMF comprising:

a transceiver; and a controller configured to:

receive, from an access and mobility management function (AMF), a request for assigning a UE radio capability identifier (ID) of a UE corresponding to UE radio capability information, the request including the UE radio capability information, determine that the UE radio capability information is not received in both a first format associated with a first system and a second format associated with a second system and that a match of the UE radio capability information is not found in a database of the UCMF, and based on the determination, transmitting, to the AMF, a message that rejects the request for assigning the UE radio capability ID, wherein the UCMF is configured to operate in a mode where a next generation radio access network (NG-RAN) provides the UE radio capability information in both the first format and the second format, and the UCMF is not required to transcode between the first format and the second format.

8. The UCMF of claim 7, wherein the message indicates that there is no UE radio capability ID to be assigned.

9. The UCMF of claim 7, wherein the first format is a fifth-generation system (5GS) format and the second format is an evolved packet system (EPS) format, and wherein the UE radio capability information is in the 5GS format or in the EPS format or in both the 5GS and the EPS format.

10. An access and mobility management function (AMF) in a communication system, the AMF comprising:

a transceiver; and a controller configured to:

transmit, to a user equipment (UE) radio capability management function (UCMF) via the transceiver, a request for assigning a UE radio capability identifier (ID) of a UE corresponding to UE radio capability information, the request including the UE radio capability information, and receive, from the UCMF via the transceiver, a message that rejects the request for assigning the UE radio capability ID, in case that the UE radio capability information is not transmitted in both a first format associated with a first system and a second format associated with a second system and a match of the UE radio capability information is not found in a database of the UCMF, wherein the UCMF is configured to operate in a mode where a next generation radio access network (NG-RAN) provides the UE radio capability information in both the first format and the second format, and the UCMF is not required to transcode between the first format and the second format.

11. The AMF of claim 10, wherein the message indicates that there is no UE radio capability ID to be assigned.

12. The AMF of claim 10, wherein the first format is a fifth-generation system (5GS) format and the second format is an evolved packet system (EPS) format, and wherein the UE radio capability information is in the 5GS format or in the EPS format or in both the 5GS and the EPS format.

* * * * *